Figure 4:
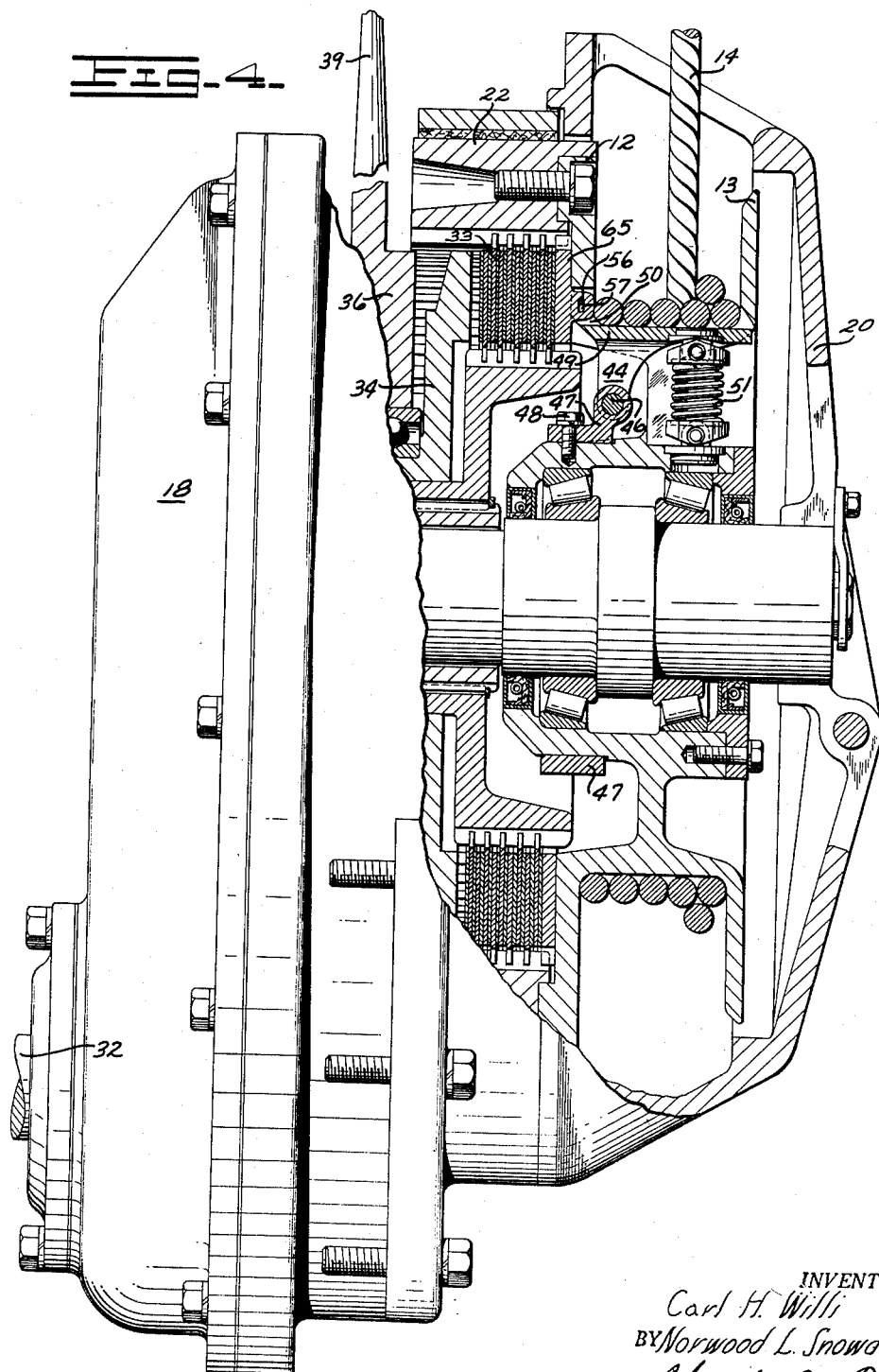

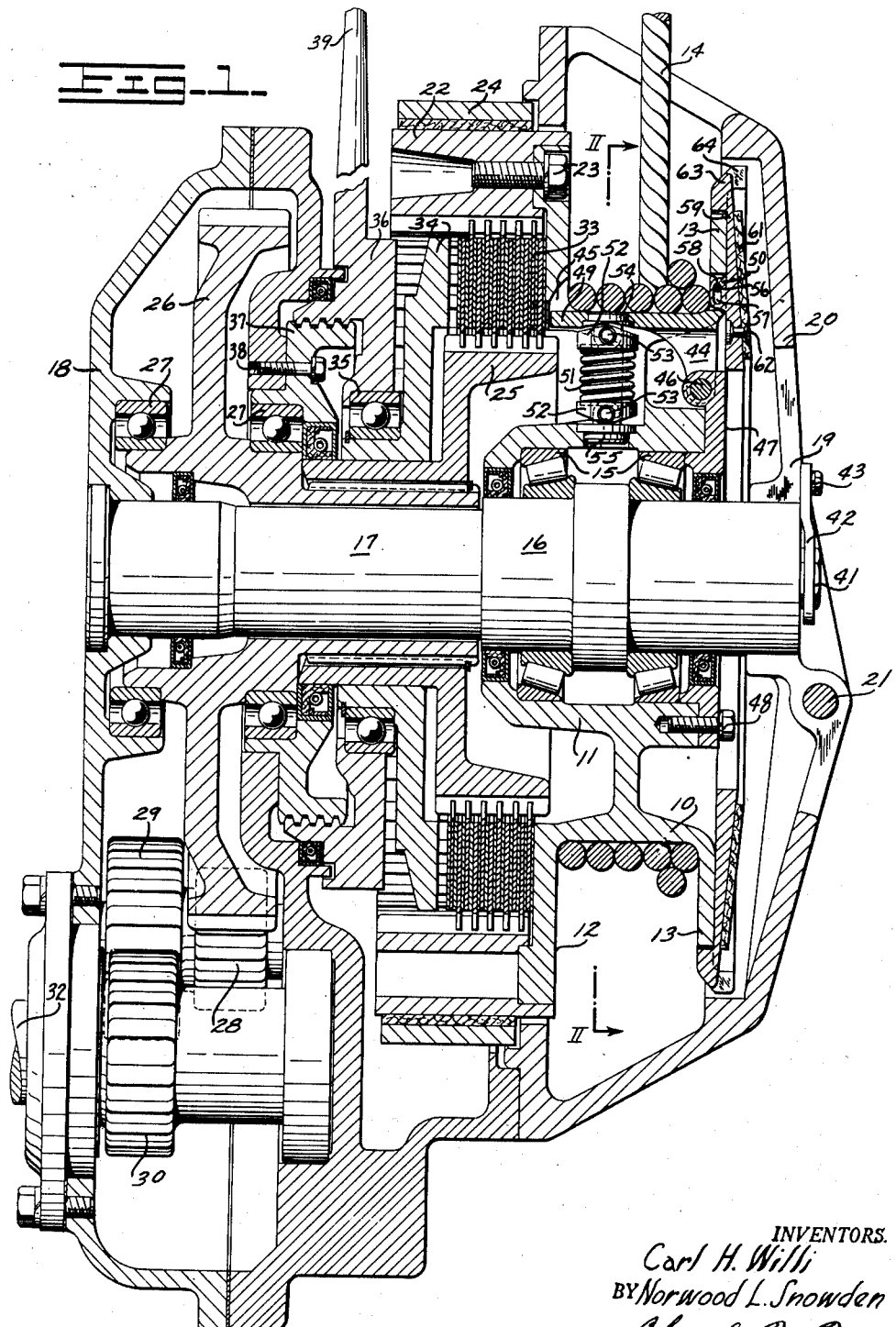

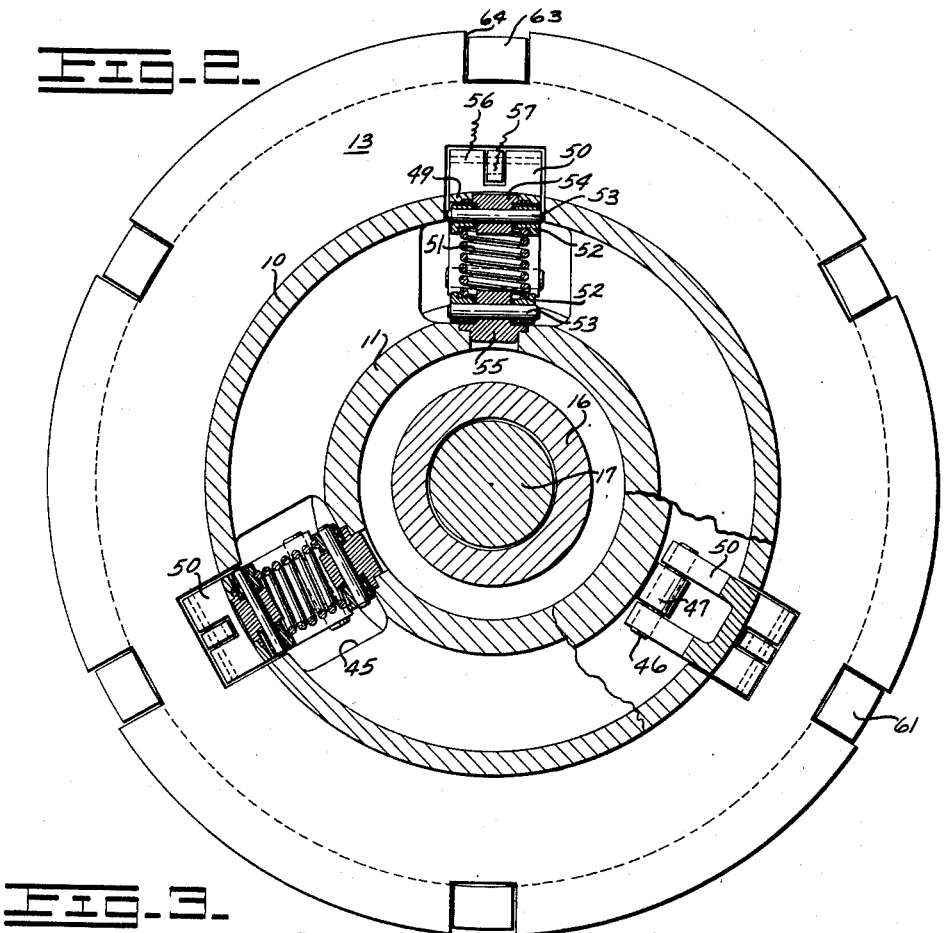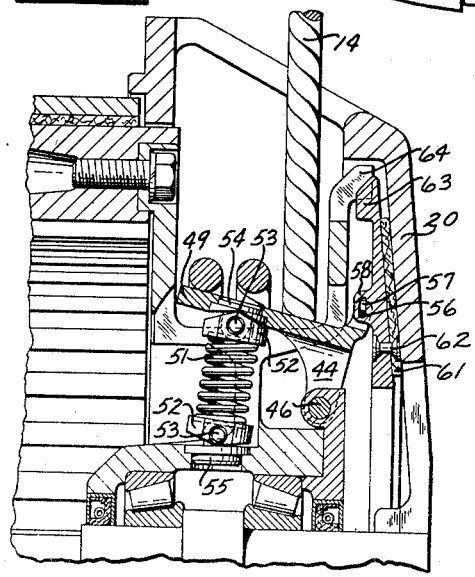

May 13, 1952 C. H. WILLI ET AL 2,596,318
CONTROL FOR CABLE WINDING DRUMS
Filed May 19, 1948 3 Sheets-Sheet 3

INVENTORS.
Carl H. Willi
BY Norwood L. Snowden
Charles M. Fryer
ATTORNEY.

Patented May 13, 1952

2,596,318

UNITED STATES PATENT OFFICE 2,596,318

CONTROL FOR CABLE WINDING DRUMS

Carl H. Willi and Norwood L. Snowden, Peoria, Ill., assignors to Caterpillar Tractor Co., Peoria, Ill., a corporation of California Application May 19, 1948, Serial No. 27,894

3 Claims. (Cl. 254—173)

This invention relates to a device for preventing a cable winding drum or winch from overspooling or paying out an excessive amount of cable; the device being automatically operable when the cable becomes slack.

This invention is particularly adapted for use in connection with winches or other cable controlling devices wherein the cable winding drum is powered for rotation in one direction through a clutch and is free to rotate in the opposite direction to pay out the cable. Such winches are commonly used for raising and lowering a working implement and are usually provided with a manually actuated brake for holding the implement in a raised position. In operation, lowering of the cable controlled implement is accomplished by disengaging the clutch and permitting the cable winding drum to rotate freely in a direction to spool out the cable. When the downward movement of the cable controlled implement is stopped from an external source, such as striking an obstruction, the cable winding drum will, due to its own inertia, continue to rotate until the manually actuated brake is applied. It is usually impractical for the operator to apply the brake in time to prevent the cable winding drum from paying out an excessive amount of cable. This overspooling permits the slack cable to form loops or kinks which upon subsequent reeling in on the cable are the cause of excessive bending stresses, resulting in early failure of the cable. In the past, it has been the practice to preload the bearings carrying the cable winding drum sufficiently to retard free rotation of the drum but this results in rapid wear on the bearings and consequent necessity for frequent adjustment and replacement.

It is therefore an object of this invention to provide a device associated with a cable winding drum which will prevent rotation of the drum when its cable becomes slack; such device being automatically operable in response to tension on the cable. Further and more specific objects and advantages of this invention will be made apparent in the following specification wherein reference is made to the accompanying drawings.

For purposes of illustration, the invention is disclosed herein in its application to a cable control mechanism of the kind employed on a tractor wherein a power takeoff shaft of the tractor is connected with a cable winding drum. Its adaptability to other uses will, however, be readily apparent as the description proceeds.

In the drawings:

Fig. 1 is a vertical section through a cable control unit illustrating a cable winding drum incorporating the present invention, Fig. 2 is a sectional view taken along line II—II of Fig. 1, Fig. 3 is a fragmentary sectional view of part of the mechanism shown in Fig. 1 but illustrating the braking parts in engaged position, and Fig. 4 is a side elevation of a modified form of the invention with the major parts shown in section.

In Fig. 1 of the drawings, a cable control unit of the type commonly employed with a tractor is illustrated as comprising a cable winding drum 10, having a hub 11 and side flanges 12 and 13 for the reception of a cable 14 which may extend to any suitable cable controlled implement such as a bulldozer associated with the tractor. The hub 11 is mounted for rotation on a pair of spaced bearings 15, carried on a stationary sleeve 16, having a threaded connection (not shown) with a stub shaft 17. The stub shaft 17 is non-rotatably supported in a housing 18 enclosing substantially all of the cable control unit. The sleeve 16 extends through a split opening 19, provided in a cover 20, rigidly secured to the housing 18 in any suitable manner. The opening 19 is adapted to be securely clamped about the sleeve 16 by a cap screw 21 associated with one of its split portions in a conventional manner.

The cable winding drum 10 carries a clutch and brake drum 22, rigidly secured to its flange 12 by means of cap screws 23. A brake band 24 circumscribes the drum 22 and is controlled by a conventional brake control mechanism (not shown). An inner clutch drum 25 is carried on the extending hub of a gear 26 and is non-rotatably connected thereto by means of a splined connection as shown. The gear 26 is mounted for rotation on a pair of bearings 27, carried in the housing 18, and is powered for rotation through a train of gears, illustrated at 28, 29 and 30, from a power take-off shaft 32, associated with the tractor transmission. The inner drum 25 and outer drum 22 carry opposed sets of clutch plates forming a stack of clutch plates illustrated at 33.

The clutch plates carried by each of the drums are adapted in a conventional manner to rotate with relation to each other so there is normally no driving connection between the inner and outer drums. However, compression of the clutch plates between the flange 12 of the cable winding drum and a clutch pressure plate 34, brings the plates into frictional contact to effect a driving connection. The pressure plate 34 carries a bearing 35 embraced by a collar 36. The collar 36 has a threaded connection with a sleeve 37, rigidly secured to the housing 18 by means of cap screws 38. A manual control arm 39 extends from the collar 36 and is provided for the purpose of rotating the collar relative to the sleeve 37. Such rotation results in axial movement of the pressure plate 34 to effect engagement of the clutch plates 33.

Adjustment of the clutch is accomplished by rotation of the sleeve 16, relative to the shaft 17, and to facilitate this rotation a hexagonal boss 41 is formed on the extending end of the sleeve. The sleeve 16 is retained in its adjusted position by means of a lock 42, secured to the cover 20 by means of a cap screw 43.

Through the mechanism thus far described, rotation of the collar 36 imparts axial movement to the pressure plate 34 establishing a drive from the power take-off shaft 32 to the cable winding drum 10, rotating the drum in a direction to take in on the cable 14 thus raising or adjusting the working implement. The implement is lowered by disengaging the clutch and permitting the cable winding drum to rotate freely in response to tension on the cable 14. When the working implement comes to rest such as by contact with the ground, the drum 10 will continue to rotate for some time after the tension is removed from the cable 14, due to its own inertia. This rotation is normally stopped by applying the brake 24, however, due to the inability of the operator to apply the brake quickly enough, the drum will frequently over-spool, permitting the slack cable to loop and to kink when tension is again applied to the cable.

It is to a means for preventing this over-spooling that this invention is directed and it is for this purpose that a plurality of bellcranks 44 circumferentially spaced around the periphery of the cable winding drum are provided. Each of the bellcranks is disposed in a suitable opening 45 provided in the cable winding drum and is pivotally supported as by a pin 46 from a collar 47, rigidly secured to the hub 11 of the cable winding drum as by cap screws 48. Each bellcrank is provided with extending arms 49 and 50. The arm 49 extends transversely of the periphery of the cable winding drum while the arm 50 extends radially outward along the flange 13 of the drum. Each bellcrank is normally retained in the position illustrated in Fig. 1 by the wraps or turns of the cable 14 on the drum and a spring 51, disposed between the arm 49 and the roller hub 11. As is more clearly illustrated in Fig. 2, each spring is disposed between spring retainers 52, pivotally connected as by pins 53 to end plugs 54 and 55, rigidly secured to the arm 49 of the bellcrank and the hub 11 of the cable winding drum respectively.

The outwardly extending arm 50 of each of the bellcranks is bifurcated and at its end carries a pin 56. The pin 56 is received in a slotted aperture 57 provided in an ear 58, extending rearwardly from a brake disc 59. A suitable friction material 67 is secured to the disc 59 as by rivets 62 and is adapted to be moved axially upon rocking of the bellcrank 44 about its pivotal support 46 into frictional engagement with the cover 20 thereby retarding rotation relative to the cover. The periphery of the brake disc 59 is provided with a plurality of circumferentially spaced rearwardly extending lugs 63 which are received within suitable cutouts 64, provided in the periphery of the flange 13 of the cable winding drum. The lugs 63 prevent relative rotation between the drum and brake disc and prevent any braking torque from being transmitted to the bellcranks 44.

Whenever tension is removed from the cable 14, that part of the cable wrapped around the drum tends, through its own resiliency, to straighten and thus to become spaced from the surface of the drum. When this occurs, the cable no longer bears on the parts 49 of the levers so the springs 51 rock the bellcranks 44 in a clockwise direction as viewed in Fig. 1, moving the brake disc 59 outwardly into frictional engagement with cover 20 as illustrated in Fig. 3. Engagement of the brake disc 59, with the cover 20, retards further rotation of the drum until tension is again applied to the cable 14. When the tension is again applied to the cable, the bellcranks 44 are returned to their normal position shown in Fig. 1.

A modified form of the invention is illustrated in Fig. 4 in which the bellcrank 44 is illustrated as reversed in position and as carrying an annular plate 65 having a splined connection with the outer clutch and brake drum 22. The plate 65 is pivotally connected to the arm 50 in the same manner as previously described. In this modification, removal of tension from the cable 14 permits the springs 51 to rotate the bellcranks 44 in a counter-clockwise direction as viewed in Fig. 4. Thus the plate 65 is moved to compress the clutch plates 33, establishing a driving connection to the cable winding drum 10, and rotating it in a direction to retension the cable. When the cable 14 is again drawn taut the bellcranks will be returned to the disengaged position, illustrated in Fig. 4.

We claim:

1. In a drum for winding cable or the like, means to overcome the tendency of the drum in paying out cable to over-spool the cable comprising a drum surface for receiving wound cable, levers adjacent to and extending the full width of the drum surface, said levers being pivotally mounted on the drum for movement outward from said drum surface resilient means acting directly on said levers adjacent the drum surface tending to swing said levers outwardly against the cable wound on the drum, and means controlled by said levers to prevent further paying out of cable.

2. In a cable winding drum, braking means to stop rotation of the drum as it pays out cable, springs urging said braking means to operate, levers having arms which serve the purpose of retaining said springs in ineffective positions and of acting as connections between said springs and said braking means, said levers having one of their arms contiguous to and extending the full width of the drum and engageable by the cable when it is tightly wound upon the drum to press directly down on the springs and consequently to hold the springs in said ineffective positions.

3. In a drum for winding cable or the like, means to overcome the tendency of the drum to overspool when paying out cable comprising a drum surface for receiving wound cable, a brake for stopping drum rotation, a bellcrank lever pivoted in the hub portion of the cable winding drum and having a cable contacting arm and a brake control arm, said cable contacting arm extending substantially the width of the drum surface in a slot on said drum surface and normally retained by turns of the cable on the drum, a spring urging said cable contacting arm upward against the cable and consequently urging the brake control arm towards a brake applying position.

CARL H. WILLI.
NORWOOD L. SNOWDEN.

REFERENCES CITED

The following references are of record in the file of this patent:

UNITED STATES PATENTS

| Number | Name | Date |
|---|---|---|
| 309,314 | Post | Dec. 16, 1884 |
| 516,987 | Frisbie | Mar. 20, 1894 |
| 560,209 | Herdman | May 19, 1896 |
| 1,254,631 | Shepard | Jan. 22, 1918 |
| 2,053,976 | Stahl | Sept. 8, 1936 |